(12) United States Patent
des Garennes et al.

(10) Patent No.: US 7,581,684 B2
(45) Date of Patent: Sep. 1, 2009

(54) DEVICE FOR PLACING MATERIAL ON OR BENEATH THE SOIL SURFACE AND METHOD FOR DOING THE SAME

(76) Inventors: Chris des Garennes, 251 Thomas Jefferson Ter., Elkton, MD (US) 21921; Peter van Drumpt, 121 Bowne Rd., Wayside, NJ (US) 07712

(*) Notice: Subject to any disclaimer, the term of this patent is extended or adjusted under 35 U.S.C. 154(b) by 100 days.

(21) Appl. No.: 11/137,108

(22) Filed: May 25, 2005

(65) Prior Publication Data

US 2005/0284348 A1 Dec. 29, 2005

Related U.S. Application Data

(60) Provisional application No. 60/574,392, filed on May 25, 2004.

(51) Int. Cl.
*A01G 25/09* (2006.01)
*B05B 1/08* (2006.01)
(52) U.S. Cl. .................... 239/172; 239/162; 239/589.1

(58) Field of Classification Search ......... 239/146–148, 239/159, 172, 726, 727, 302, 344, 354, 337, 239/398, 414, 162, 589.1; 111/127
See application file for complete search history.

(56) References Cited

U.S. PATENT DOCUMENTS

| 3,926,371 | A | | 12/1975 | Harrell et al. |
| 4,211,175 | A | | 7/1980 | van der Lely |
| 4,296,875 | A | * | 10/1981 | Borglum ................ 222/617 |
| 4,469,024 | A | * | 9/1984 | Schwartz et al. ........... 101/147 |
| 4,518,118 | A | * | 5/1985 | Takata .................... 239/163 |
| 4,673,130 | A | * | 6/1987 | Simpson ................. 239/167 |
| 5,050,771 | A | * | 9/1991 | Hanson et al. ............. 222/1 |
| 6,827,042 | B1 | * | 12/2004 | Riddle et al. ............. 119/712 |

* cited by examiner

*Primary Examiner*—Davis Hwu
(74) *Attorney, Agent, or Firm*—Reed Smith LLP (57) ABSTRACT

The invention includes a towable device for treating and maintaining turf, which includes at least one roller and manifold assembly that further includes at least one injection head for directing periodic jets of liquid and at least one additive material into the ground, where the at least one injection head creates a discharge pattern greater than 30 inches in width. Also included is a liquid supply system for supplying pressurized liquid to the at least one injection head, an additive supply system for introducing the at least one additive material to the liquid within the at least one injection head, and a control system for controlling discharge from the at least one injection head. Additionally, the invention includes a method of treating and maintaining turf.

28 Claims, 12 Drawing Sheets

DEVICE FOR PLACING MATERIAL ON OR BENEATH THE SOIL SURFACE AND METHOD FOR DOING THE SAME

RELATED APPLICATIONS

This application claims priority to U.S. Provisional Patent Application Ser. No. 60/574,392, filed May 25, 2004.

FIELD OF THE INVENTION

The invention relates to the field of turf, ornamental landscaping and soil maintenance, and, more specifically, to a device for placing substances on or beneath the soil surface in a substantially non-disruptive manner.

BACKGROUND OF THE INVENTION

Turf and soil maintenance, for those involved in the golfing industry and turf grass management, for example, plays a critical role in the success of a business. The greens and fairways provide the surface where golfers spend the majority of their time. Proper treatment and maintenance of that surface creates a higher quality product, and provides for a more aesthetically appealing landscape, which creates a highly attractive and desirable course for play.

The introduction of various materials, such as soil amendments, fertilizers, insecticides, and other additives, as well as the process of aeration, may improve the properties of the soil and the growth it supports. Aeration, for example, may be used to control compaction, soil temperature, regulate soil moisture, improve drainage, stimulate microbial activity and improve overall soil tilth. Timely aeration improves soil texture, and, through the incorporation of certain physical additives or biologicals, may prevent soil from becoming compacted, which impedes overall plant health, seed germination, root growth, and water transmission.

Another important aspect may be the time involved in maintaining ground surfaces. On a golf course, for example, golf play usually drops off significantly after aeration, as more experienced golfers may inquire about the aeration schedules, and avoid those times. This may result in lost revenue. Labor costs of cleanup, such as the cleanup of the plugs, spreading of soil amendments and topdressing may be very high.

Historically, the introduction of materials to the soil surface or subsurface was accomplished through use of tillage tools that cut or plow the surface and release the additives into the openings created. While this technique may work for industries such as farming, the amount of soil eruption and surface disturbance is unacceptable for golf courses and other landscapes that have value in their visual appeal.

Other methods have also been used, such as core aeration, which is also disruptive to the ground surface. Alternatively, techniques such as injection of liquid substances into the subsurface using high pressure water jets, may not be as disruptive to the ground surface, but are generally limited to use of liquid or wet additive materials. Additionally, these other methods may involve machinery that is more expensive and require more time, thus increasing the total costs involved in the treatment and maintenance of the ground surface.

Thus, a need exists for a faster, more mobile, cost effective system for treating and maintaining a ground surface that minimizes disturbance to the ground surface, while maximizing the number and types of materials usable as additives.

SUMMARY OF THE INVENTION

The invention includes a towable device for treating and maintaining turf, which includes at least one roller and manifold assembly that further includes at least one injection head for directing periodic jets of liquid and at least one additive material into the ground, where the at least one injection head creates a discharge pattern greater than 30 inches in width. Also included is a liquid supply system for supplying pressurized liquid to the at least one injection head, an additive supply system for introducing the at least one additive material to the liquid within the at least one injection head, and a control system for controlling discharge from the at least one injection head.

Additionally, the invention includes a method of treating and maintaining turf, which includes the steps of producing successive jets of pressurized liquid, directing the successive jets of pressurized liquid toward the ground, creating a distribution pattern greater than 30 inches in width along a path of travel, and where the successive jets of pressurized liquid are at spaced intervals along the path of travel, producing successive charges of at least one additive material, maintaining each charge of the at least one additive material isolated from the liquid until a corresponding jet has been produced, and introducing a charge of the at least one additive material into the corresponding jet as the corresponding jet is directed toward the ground.

BRIEF DESCRIPTION OF THE FIGURES

Understanding of the present invention will be facilitated by consideration of the following detailed description of the preferred embodiments of the present invention taken in conjunction with the accompanying drawings, in which like numerals refer to like parts.

DETAILED DESCRIPTION OF THE PREFERRED EMBODIMENTS

It is to be understood that the figures and descriptions of the present invention have been simplified to illustrate elements that are relevant for a clear understanding of the present invention, while eliminating, for the purpose of clarity, many other elements found in typical turf and soil management systems and methods of using the same. Those of ordinary skill in the art may recognize that other elements and/or steps are desirable and/or required in implementing the present invention. However, because such elements and steps are well known in the art, and because they do not facilitate a better understanding of the present invention, a discussion of such elements and steps is not provided herein. The disclosure herein is directed to all such variations and modifications to such elements and methods known to those skilled in the art.

According to an aspect of the present invention, a substance, such as a liquid, solid or air, may be used to effectively drill a hole in the soil. This hole may have a diameter in the range 0.1 to 2.0 inches. Substantially simultaneously, the created hole may be filled with a soil amendment. Upon filling, the surface of the soil is left substantially smooth, with minimal soil disruption and displacement.

Additives may be injected, such as by a vacuum created through the Venturi Effect, where the substance fires, and the additive may be sucked into the injection stream. Since this occurs after the injection port, many dry and/or liquid materials may be added into the stream, including: sand/top dressing; diatomaceous earth; calcined clay; seed; insecticides; herbicides; fungicides; biologics; and root stimulants, by way of non-limiting example only.

According to an aspect of the present invention, the present device and system may be used to relieve stress in the soil, such as a golfing green. The device may also provide deep penetration of additives into the soil. Such access may be as great as 10 inches in depth.

The device according to an aspect of the present invention may be used to punch through sod to give roots deep access; punch through a fiber or stabilized sports turf to allow better root proliferation below a mesh; aerate, amend and topdress in one pass and allow for play on a smooth surface in approximately one hour.

The method and device described herein may provide a way of successfully placing granular materials into the ground without mechanically penetrating the soil with a solid tool of some type. The jets, using water or air blasts, may carry the material into the soil and leave no eruption on the surface to interfere with any immediately following activities or other treatments. This may be particularly beneficial where the particles are being added to lawns, putting greens and fairways on golf courses, sports fields and the like.

The present invention may provide a way of more accurately achieving the application rate selected for the particular aeration. Instead of setting the nozzles to fire at certain time intervals and similarly controlling the metering of dry materials to the nozzles, the present invention fires its nozzles as a function of the distance traversed by the device along its path of travel. A certain firing rate as a function of the distance traveled may be programmed into the device. Thus, until the device travels its pre-set distance, the next blast from the nozzles may not occur, regardless of whether the device travels quickly or slowly over such distance. In other words, although the spacing between slots may be adjusted by the operator, once a selection is made, that spacing (from the beginning of one slot to the beginning of the next slot) remains substantially fixed.

The present invention utilizes a method for mixing a particulate matter with a driving liquid into a ground surface or otherwise aerating a ground surface with a combination of air and a driving liquid. An exemplary use of such a method may be found in U.S. Pat. No. 5,370,069 to Monroe, the entire disclosure of which is incorporated in its entirety by reference herein.

Figure 1:
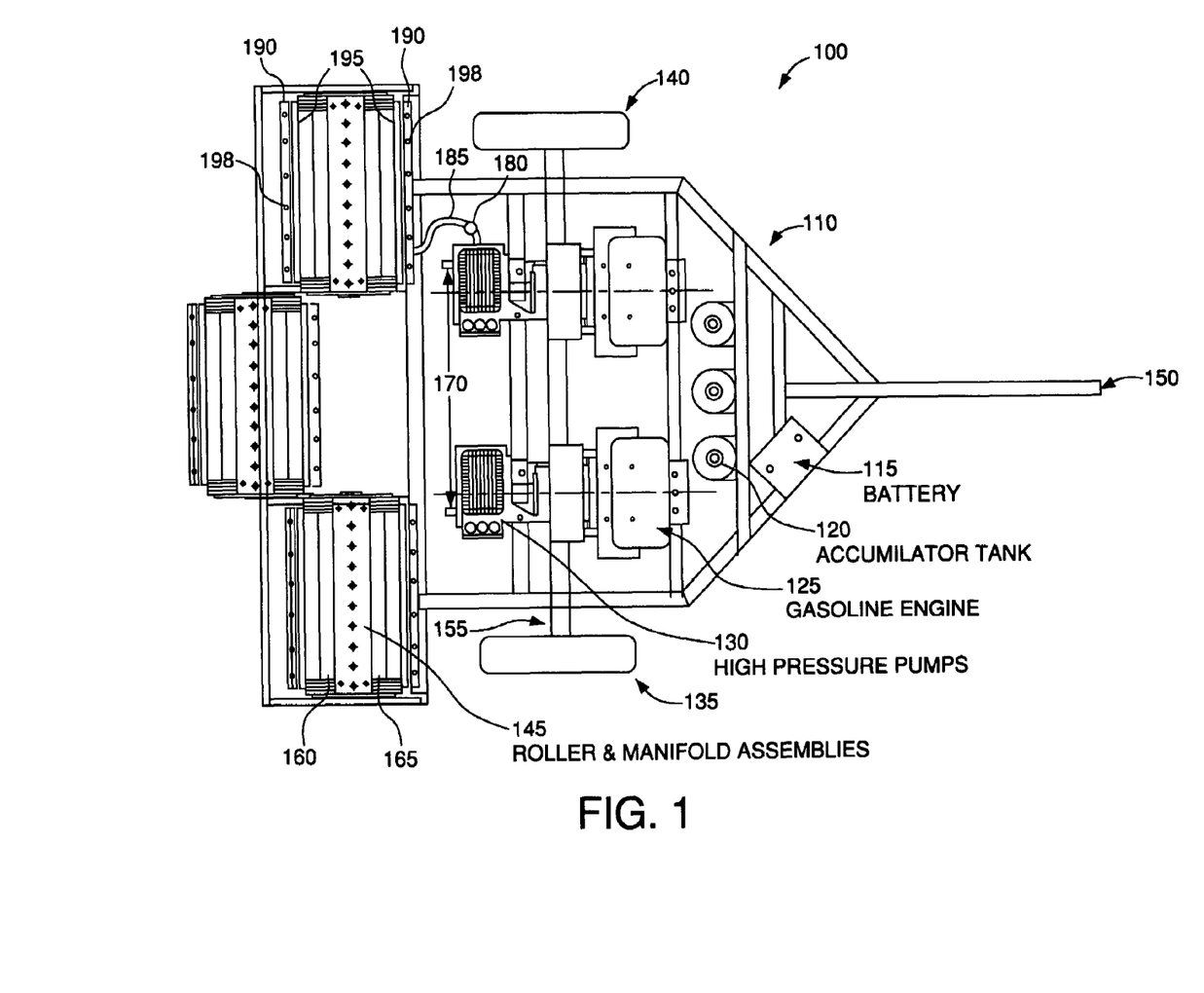
FIG. 1 is an overhead view of an exemplary embodiment of the present invention.

Referring now to FIG. 1, there is shown a device 100 for substantial non-disruptive delivery of dry or wet material into the soil subsurface. Device 100 may include a frame 110, at least one battery 115, at least one accumulator tank 120, at least one engine or motor 125, at least one pump 130, at least two ground wheels 135 and 140, at least one roller and manifold assembly 145, a hitch 150, and an axle 155. As may be seen in FIG. 1, frame 110 may provide the structure of device 100 which holds battery 115, at least one accumulator tank 120, engine 125, at least one pump 130, at least one roller and manifold assembly 145, and a hitch 150 while being supported by at least two ground wheels 135 and 140 interconnected by axle 155.

Device 100 may be designed to be pulled or towed by any piece of equipment known to those possessing an ordinary skill in the pertinent arts. Such pulling or towing equipment include, but are not limited to, tractors, golf carts, and automobiles. Device 100 may be designed to be pulled during transport, such as on a path, road or highway, by any piece of equipment capable of transiting between the two places for use or storage of device 100. For example, if device 100 is being transported across a golf course, device 100 may be pulled by a golf cart. If device 100 is being transported across the country, device 100 may be pulled on the highway by an automobile. When device 100 reaches its destination operation may be accomplished simply by hooking up a water supply.

Device 100 may be designed to allow for towing while controlling device operation. Device 100 may be attached at hitch 150 to a tractor, or other vehicle suitable for towing while in operation, such as by a ball hitch or any other attachment mechanism known to those possessing an ordinary skill in the pertinent art. Device 100 may have two ground wheels 135 and 140. Ground wheels 135 and 140 may not be driven and may each operate as a free-wheel as the device is towed along the ground.

Figure 2:
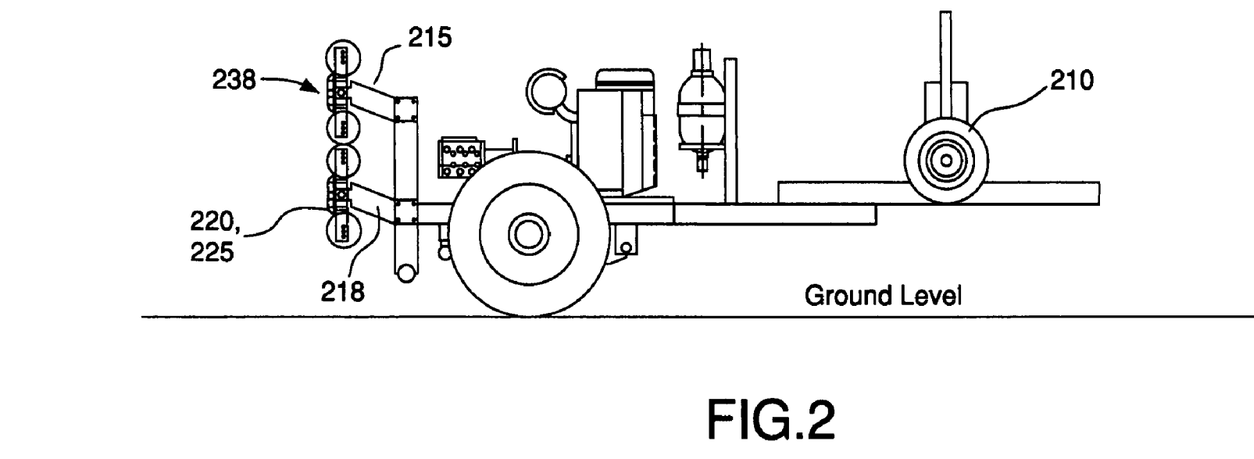
FIG. 2 is a side view of an exemplary embodiment of the present invention while in a position for towing.
Figure 3:
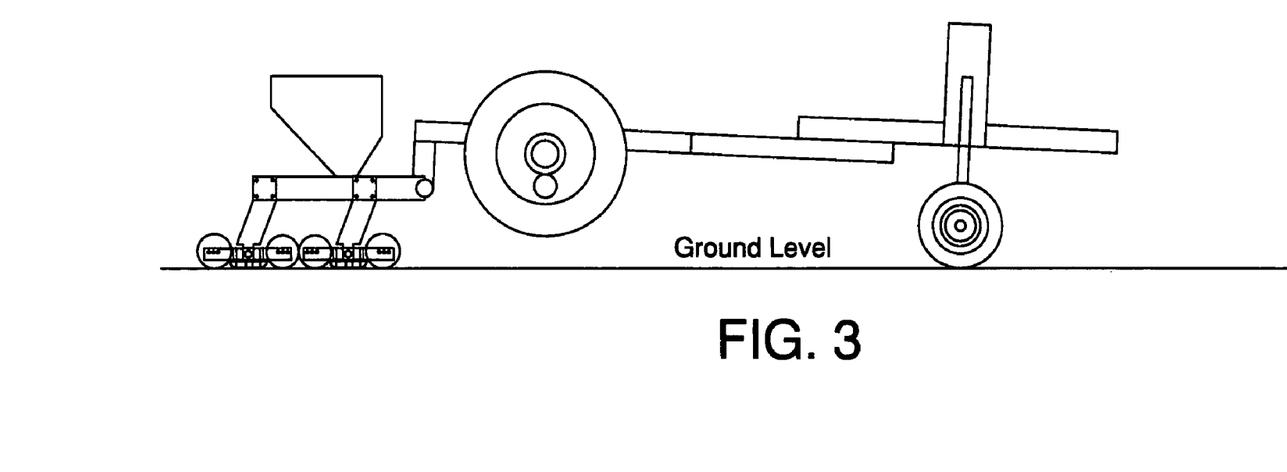
FIG. 3 is a side view of an exemplary embodiment of the present invention while in a position for treatment of the ground surface.

Referring now also to FIGS. 2 and 3, wherein there is shown device 100 according to an aspect of the present invention. Device 100 may include a frame 110, ground wheels 135 and 140 and sensor wheel 210 (FIG. 2). Sensor wheel 210 may be located at one end of frame 110 in the vicinity of hitch 150. Sensor wheel 210 may be lifted as shown in FIG. 2 during transport and may be lowered to contact the treating surface as shown in FIG. 3 during operation, such that frame 110, ground wheels 135 and 140 and sensor wheel 210 may support components of device 100. Ground wheels 135 and 140 may be located on frame 110 distal to sensor wheel 210. Each of ground wheels 135 and 140 may be located on opposite sides of frame 110.

Ground wheels 135 and 140 may be connected by a transverse axial or shaft 155 rotatably coupled to frame 110, as would be evident to one possessing an ordinary skill in the pertinent arts. Ground wheels 135 and 140 and axial 155 may be elevated relative to frame 110 to enable at least one roller and manifold assembly 145 to engage the ground, or other surface on which device 100 rests. Ground wheels 135 and 140 and axial 155 may be lowered relative to frame 110 to permit transport of device 100 on ground wheels 135 and 140. Ground wheels 135 and 140 and axial 155 may be rigidly attached relative to frame 110, while at least one roller and manifold assembly 145 rotates to engage the ground. A pair of spaced apart, transversely disposed pressing rollers 160 and 165 may be included within at least one roller and manifold assembly 145.

Several systems which make up the operating components of the device may be carried by frame 110. These systems may include an injection system included within at least one roller and manifold assembly 145, a water supply system, including at least one pump 130, an additive supply system, and a control system.

Roller and manifold assembly 145 may be disengaged and held above the ground surface, as shown in FIG. 2, or may be engaged, as shown in FIG. 3, where at least one roller and manifold assembly 145 may be supportive of frame 110, such that roller and manifold assembly or assemblies 145 and sensor wheel 210 support frame 110, and ground wheels 135 and 140 are lifted above the ground surface. Roller and manifold assembly 145 when disengaged, may be held above and substantially perpendicular to the ground so that they may be easily accessed for cleaning and other handling and maintenance purposes. A plurality of hanger brackets 215, 218 may support at least one roller and manifold assembly 145 to frame 110. Plurality of hanger brackets 215, 218 may support a pair of bars 220, 225, such as fore and aft, on opposite sides of at least one roller and manifold assembly 145. Bars 220 and 225 may be configured to rotatably support pressing rollers 160 and 165 on opposite, such as fore-and-aft, sides of injection head 410 of at least one roller and manifold assembly 145. A cover 230, such as a skid plate, may span bars, 220, 225 adjacent to head 410 and may be substantially rigidly fixed to bars 220,225. Cover 230 may protect outlet cones 425 of injection head 410 from damage through impact with obstacles. At least one upstanding bracket 415 (FIG. 4) may be included to form a part of a sub-frame, which includes hanger brackets 215, 218, bars 220, 225 and cover 230. At least one upstanding bracket 415 may be substantially fixedly attached to portions injection head 410 to thereby fixedly secure injection head 410 to hanger brackets 215, 218.

Device 100 may include at least one manifold 145, engine 125, accumulator 120, pump 130 and control panel 3110 to maximize the speed and area covered. According to an aspect of the present invention, three manifold assemblies, two engines, three accumulators, two pumps, and one control panel may be used. The three roller and manifold assemblies 145 may be aligned forming a roller and manifold assembly pattern covering a width of approximately 90 inches. The width of the roller and manifold assembly pattern may vary, according to the number and size of the roller and manifold assemblies 145 used in any particular embodiment of the present invention. In order to form this large of an assembly pattern, each individual roller may be staggered with respect to at least the adjacent roller, as shown in FIG. 1. Such a configuration may permit better access to at least one roller and manifold assembly 145, such as for purposes of maintenance. The staggered roller and manifold configuration may aid in keeping the injection hole spacing even through the total width of the device. The staggered positioning may, of course, vary depending on the size and number of roller and manifold assemblies utilized, as well as according to the hole spacing expected or required. The individual manifolds within manifold assembly 145 may be designed to individually free float and articulate to thereby enable individual manifolds to better match the contours of the ground, for example.

Figure 4:
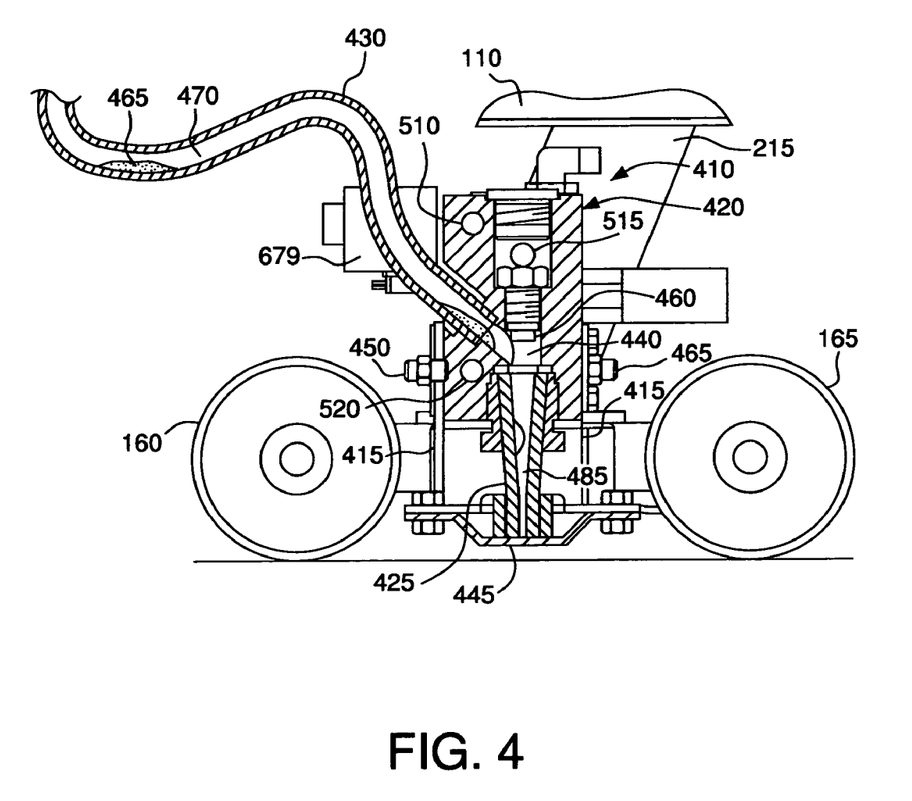
FIG. 4 is an enlarged vertical cross-sectional view of the discharge area of an exemplary embodiment of the present invention showing the injection head in its operating position.
Figure 5:
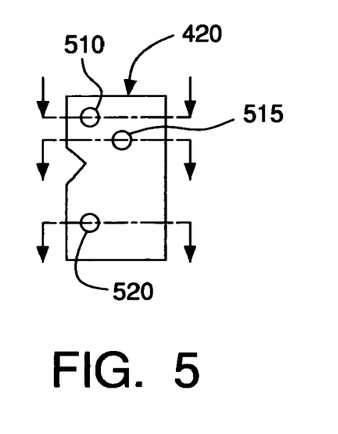
FIG. 5 is an end elevational view of the manifold block of an exemplary embodiment of the present invention.
Figure 6:
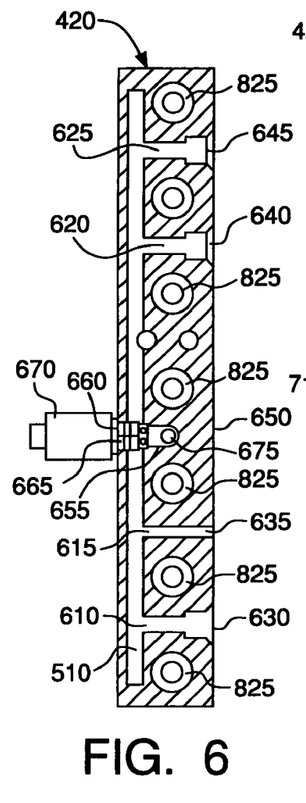
FIG. 6 is a horizontal cross sectional view of the manifold block of the exemplary embodiment of FIG. 5.
Figures 7, 8:
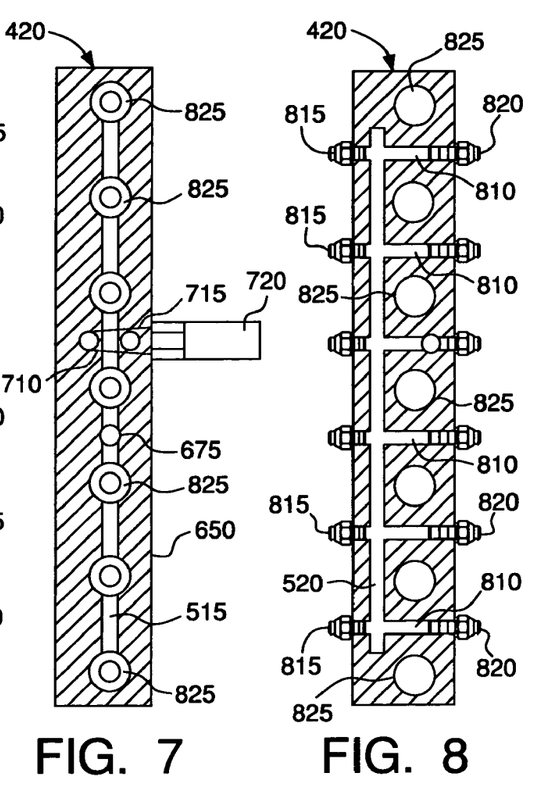
FIG. 7 is another horizontal cross-sectional view of the exemplary embodiment of FIG. 5.
FIG. 8 is another horizontal cross-sectional view of the exemplary embodiment of FIG. 5.

As shown in FIG. 4, injection head 410 may include a block-like, transversely extending manifold 420 and a series of tubular discharge cones 425 projecting from the bottom of manifold 420. According to an aspect of the present invention, thirty cones may be utilized. But it may be understood that greater or fewer numbers of cones may be utilized without departing from the principles of the present invention. As shown in FIG. 5, manifold 420 may include a set of longitudinally extending, parallel cross-drill passages. For example, three such passages 510, 515 and 520 are shown, each extending substantially horizontally through block 420 at substantially different levels. Passages 510, 515 and 520 may be seen in FIGS. 6, 7 and 8, with greater detail. In FIGS. 6, 7 and 8 passages 510, 515 and 520 have not been illustrated as extending entirely through the block from end-to-end and then closed at such opposite ends by suitable plugs as may be the case in commercial practice. Passage 510 may be located at the highest level of the three passages, while passage 515 may be located a short distance below passage 510 in laterally spaced relation thereto, while passage 520 may be located below passage 515 in the same vertical plane as passage 510, for example.

In another example, at the level of passage 510, manifold 420 may be provided with four transverse passages 610, 615, 620 and 625 that intersect with passage 510 to communicate with respective holes 630, 635, 640 and 645 substantially in rear face 650 of manifold 420 (See FIG. 6). In addition, at the level of passage 510, manifold 420 may have a fifth transverse passage 655 substantially at the center of manifold 420 as illustrated in FIG. 6 which may lead substantially rearwardly from passage 510 to a point in a substantially vertical alignment with passage 515. Passage 655 may have a substantially axially aligned bore 660 that extends forwardly across passage 510 and out the front face of manifold 420. An axially reciprocal valve stem 665 (FIGS. 6 and 12) may be slidably received within bore 660 and may be adapted to open and close communication between passage 510 and passage 655, relative to the axial position of valve stem 665. An electrically actuatable solenoid 670 may project from the front face of manifold 420 and may be coupled with valve stem 665 for extending and retracting stem 665 between open and closed positions. Valve stem 665 is shown in its closed position in FIGS. 6 and 12, a position which may seal off passage 655 from passage 510. Solenoid 670 may be designed to maintain valve stem 665 normally open. Both valve stem 665 and solenoid 670 may comprise part of control system 2210. According to an aspect of the present invention, solenoid 670 and valve stem 665 may be a standard, poppet-type, such as a stainless steel valve or other acceptable material known to those possessing an ordinary skill in the pertinent arts, which fits in a standard ⅞-14 port and may be modified for viscosity.

At a level between passage 515 and passage 520, manifold 420 may be provided with a substantially fore-and-aft extending passage 710 (FIGS. 7 and 13) and may have a larger bore 715 substantially aligned axially with passage 710, leading rearwardly across passage 515, and extending to the rear face of manifold 420. Reciprocal stem 1310 (FIG. 13) of a high pressure relief valve 720 may be slidably received within bore 715 for maintaining relief passage 710 closed, unless the pressure within passage 510 exceeds a certain predetermined level. According to an aspect of the present invention, one such suitable relief valve 720 may be a standard poppet-type relief valve modified for viscosity, preferably made of stainless steel or other corrosive resistant material, which fits into a standard ⅞-14 port.

Device 100 may include a water inlet 170. Inlet 170 may be designed to input water into device 100 such as by a hose, for example. Inlet 170 may be designed to be accessible from either side of device 100. Device 100 may include multiple inlets 170 accessible from either side of device 100 so that water may be input to device 100 on one side while progressing in one direction and then input on the other side after turning around and moving back in the other direction. Such a feature may permit the user to more easily maneuver device 100.

Substantially extending vertically through manifold 420 may be nozzle passage 825 which may take the form of a single or multiple set of passages that may be identical. According to an aspect of the present invention, seven nozzle passages 825 may be used. Nozzle passage 825 may intersect passage 515 as shown in FIG. 7 such that high pressure liquid supplied to passage 515 may also be communicated to nozzle passage 825. A series of plugs 910 (FIG. 9), such as a allen-head plug, may be threaded into the upper ends of nozzle passages 825 to close off the upper ends of the passages 825 during operation.

Figure 9:
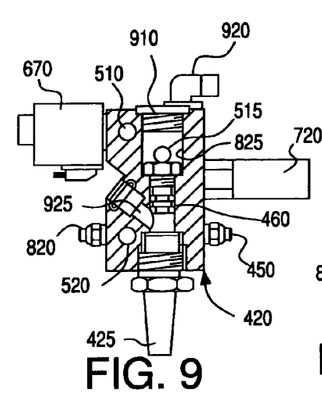
FIG. 9 is a vertical cross-sectional view of the injection head of an exemplary embodiment of the present invention.

Referring now to FIGS. 4 and 9, nozzle passages 825 may each be substantially reduced in diameter over the length of a central portion thereof starting a short distance below passage 515. Within such reduced diameter portion of each nozzle passage 825 a high pressure nozzle 915 may be threadably received for the purpose of producing a powerful high pressure jet of water when high pressure water is supplied thereto through passage 515. A mixing chamber 440 may be found immediately below the lower end of nozzle 915 within each passage 825, where mixing chamber 440 may open into a corresponding discharge cone 425.

Mixing chamber 440 within nozzle passage 825 may be enlarged with respect to restricted nozzle 825 upstream therefrom so as to create a Venturi Effect in each passage 825 at mixing chamber 440. Such a Venturi Effect may create an area of negative pressure within mixing chamber 440 to induce a secondary air stream into mixing chamber 440 via an inclined supply passage 925 as illustrated in FIGS. 4 and 9. Inclined supply passage 925 may be coupled with an additive supply hose 430 as shown, for example, in FIG. 4. Supply passages 925 and supply hoses 430 may include a portion of the additive supply system of the present invention.

Referring now to FIG. 4, discharge cones 425 may be tubular so as to present an internal passage 435. The upper portion of each passage 435 may taper downwardly from an initial diameter substantially similar to mixing chamber 440. The lower portion may be cylindrical, having a diameter approximately ⅓ that of mixing chamber 440. Cover plate 230 may be located along the bottom of injection head 410 may include a series of holes 445 disposed in a substantially vertical registration with the lower ends of cones 425. This substantial registration may avoid interference with the high pressure jets issuing from cones 425. Hardened metal or a composite material.

Figure 12:
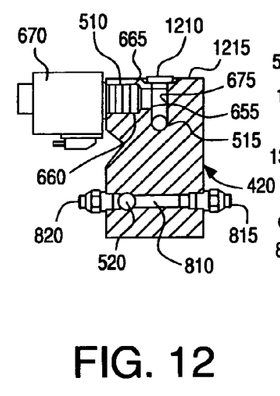
FIG. 12 is another vertical cross-sectional view of the injection head of an exemplary embodiment of the present invention.
Figure 13:
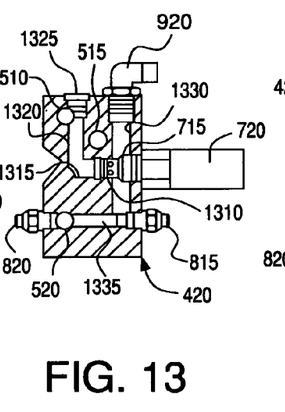
FIG. 13 is another vertical cross-sectional view of the injection head of an exemplary embodiment of the present invention.

Referring now to FIGS. 6, 7 and 12, manifold 420 may be provided with a relatively short vertical passage 675 connecting valve passage 655 with intermediate cross-drill passage 515. Thus, when solenoid valve 665 is open, passage 510 may be communicated with passage 515 via passage 655 and passage 675. When valve 665 is closed, such communication may be prevented. A small plug 1210 may be threaded into the upper end of passage 675 through the top face of manifold 420. Additionally, manifold 420 may have a substantially vertical, high pressure passage 1320, as shown in FIGS. 6, 7 and 13, that communicates passage 510 with relief passage 1315 to permit relief valve 1310 to be in substantially continuous communication with the pressurized water in passage 510. As shown in FIG. 13, a small plug 1325 may be threaded into the uppermost end of passage 1320 for the purpose of closing off the latter.

Figure 10:
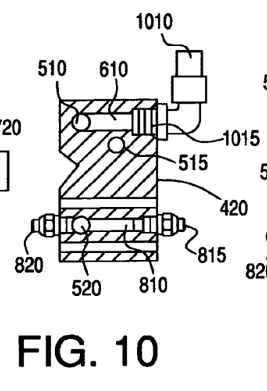
FIG. 10 is another vertical cross-sectional view of the injection head of an exemplary embodiment of the present invention.
Figure 11:
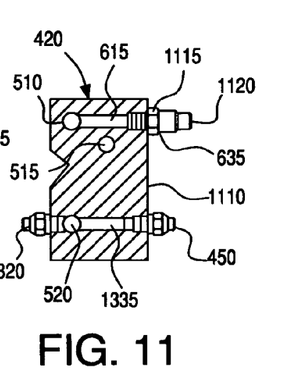
FIG. 11 is another vertical cross-sectional view of the injection head of an exemplary embodiment of the present invention.

Referring now to FIG. 10, the high pressure transverse passage 610 may be provided with an elbow fitting 1010 threaded into the hole 1015 in the rear face 1110 of the manifold block 420. Such elbow fitting 1010 may be connected to the high pressure portion of the water supply system as may be described below. Referring now also to FIG. 11, a straight fitting 1115 may be adapted to connect transverse high pressure passage 615 with a conduit 1120 that leads to a pressure meter 1515 (FIG. 15) at the rear of frame 110. As may be evident to those possessing an ordinary skill in the pertinent arts, meter 1515 may be plumbed in parallel with primary high pressure cross-drill passage 510 so as to provide an accurate reading of the pressure within cross-drill passage 510. Straight fitting 1115 may be threaded into hole 635 for passage 615 in the rear face of manifold 420.

Figure 14:
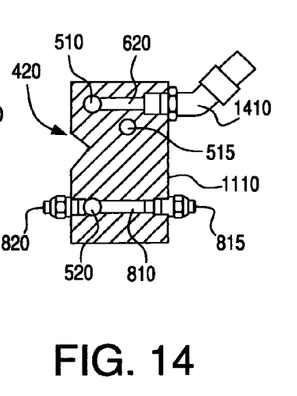
FIG. 14 is another vertical cross-sectional view of the injection head of an exemplary embodiment of the present invention.
Figure 15:
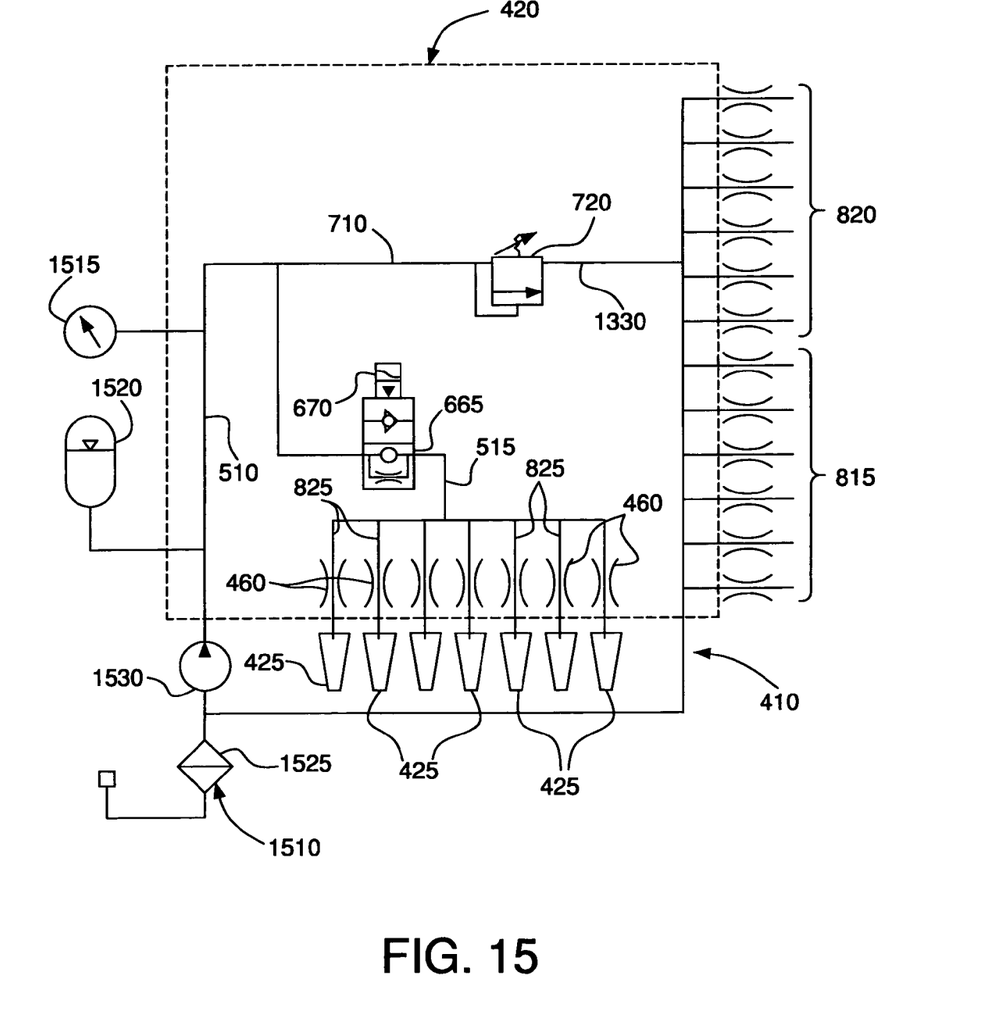
FIG. 15 is a schematic diagram of the water supply system of an exemplary embodiment of the present invention.
Figure 16:
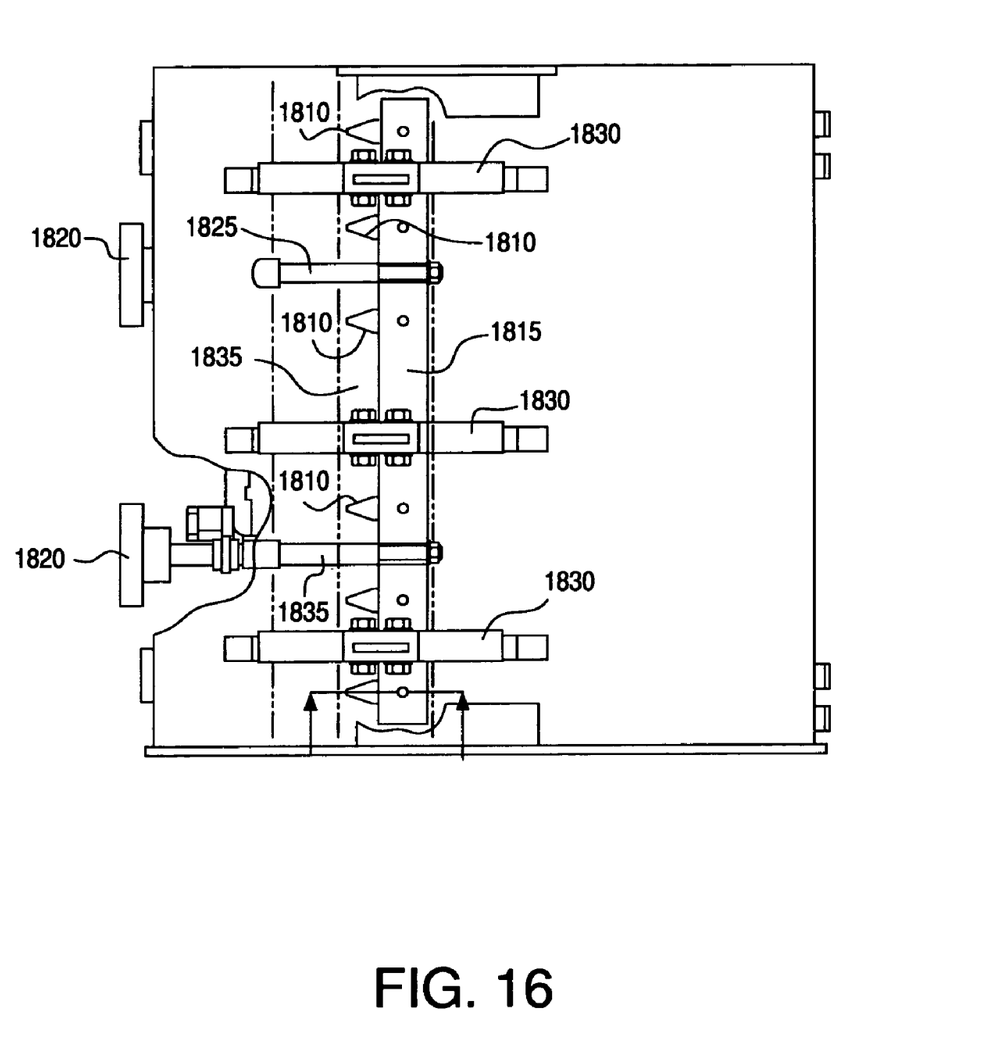
FIG. 16 is an enlarged, top plan view of an aspect of the additive supply system of an exemplary embodiment of the present invention.

Referring now to FIG. 14, transverse passage 510 may be provided with an angled fitting 1410 which may be connected with an accumulator 1520 which also forms part of the high pressure supply portion of the water supply system. As may be evident to those possessing an ordinary skill in the pertinent arts, accumulator 1520 may function to maintain the water within manifold 420 at a selected high pressure level even during discharge when the pressure has a tendency to drop. According to an aspect of the present invention, accumulator 1520 may be a standard water service type, preferably nickel-plated, four-quart bladder-type unit.

Referring now to FIG. 15 there is schematically shown the relationship between components of water supply system and discharge head 410. The incoming water may pass through a filter 1525 or series of filters before traveling to a pump 1530. Pump 1530 may be mechanically driven by an engine 125 through an output shaft 2215. According to an aspect of the present invention, a gear box and low RPM pump may be utilized. An electric clutch 2220 between output shaft 2215 and pump 1530 may be engaged and disengaged. When clutch 2220 is disengaged but water is being supplied to the device at city pressure, no high pressure water may be directed into injection head 410.

Referring again to FIG. 1, device 100 may include a cleaning system 175. Cleaning system 175 may include a single control valve 180 to control cleaning of manifold 145, or multiple manifolds 145, of device 100 or may have multiple control valves 180 each designed to clean a particular portion of manifold 145, or a single manifold 145. For example, a valve may be designed to regulate the flow of the cleaning liquid for a given manifold or all of the manifolds in device 100. Valve, or set of valves 180, may be designed to open up flow of a cleaning liquid, such as water, suitable for cleaning rollers 160,165 of roller and manifold assembly 145. This cleaning liquid may be pressurized to force debris from rollers 160,165 of roller and manifold assembly 145. According to an aspect of the present invention, cleaning system 175 may include tubing 185, or sets of tubing 185, associated with feeding the cleaning liquid from the valve to rollers 160,165 of roller and manifold assembly 145. As may be evident to those possessing an ordinary skill in the pertinent arts, nylon tubing may be utilized. Tubing 185 may be mounted to a frame 190 to permit a rigid and fixed connection to each fitting 198, which is in turn connected to the portion of the manifold that may require cleaning. The water utilized in cleaning system 175 may be provided by attaching to the low pressure side of pump 130.

Cleaning system 175 may also include a brush 195. Brush 195 may take the form of a single brush or a compliment of brushes, each designed to clean a particular portion of device 100. Brush 195 may complement the cleaning liquid discussed hereinabove, or may be used in lieu of this liquid. Brush 195 may take the form of a standard brush known to those possessing an ordinary skill in the pertinent arts.

Figure 20:
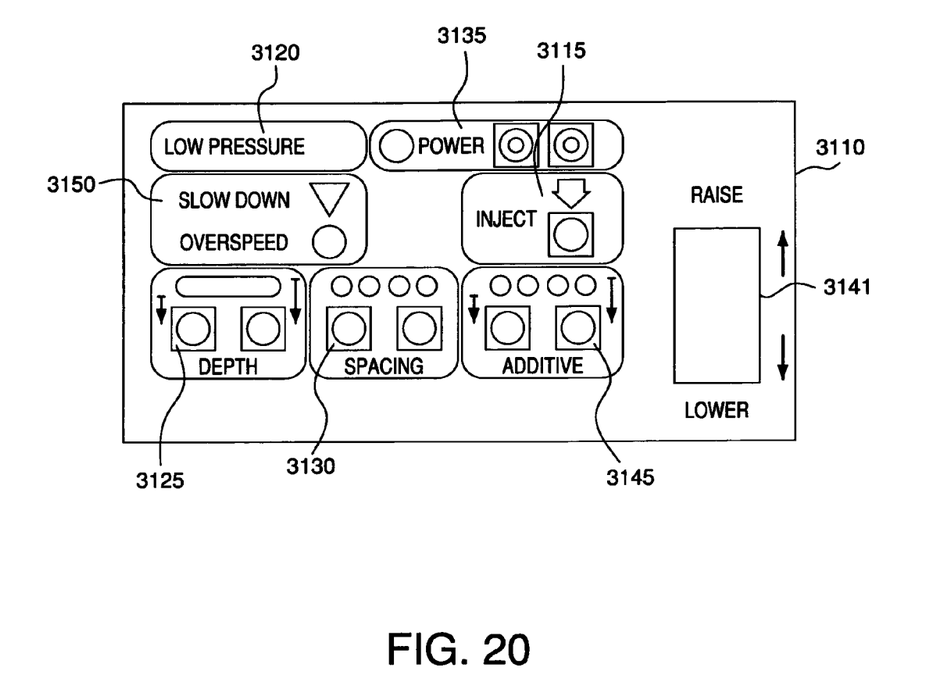
FIG. 20 is a diagram of a control panel of an exemplary embodiment of the present invention.

Referring now to FIG. 20, there is shown a control panel 3110 associated with device 100 according to an aspect of the present invention. Device 100 may include a control panel 3110 for control of device 100. Control panel 3110 may have control switches, such as for injection 3115, water pressure 3120, depth control 3125, spacing control 3130, additive 3145, and power 3135 to device 100, for example. Control panel 3110 may also provide sensory information, such as overspeed 3150 and water pressure 3120, for example.

Control panel 3110 may monitor the speed of wheel 210 and appropriately fire injectors of manifold assembly or assemblies 145 at the appropriate time and rate to thereby control the rate of additive insertion. Panel 3110 may monitor a signal generated by the sensor in wheel 210. Responsive to the signal, control panel 3110 may activate a low-pressure switch associated with water pump 130 and a lift switch 3140 associated with the injection head or heads 410 of manifold assembly or assemblies 145. Control panel 3110 may control the solenoid 670, water pump clutch 2220, and motor 125 responsive to the signal. Control panel 3110 may be programmable. Further, control panel 3110 may be programmable in the field, or on-site, for example. Such programming may be suitable for effecting the spacing and depth or aeration for example.

Control panel 3110 may provide an interface for turning power on and off, controlling the depth of the injection, controlling the spacing of the injections, controlling the volume of the additive, and raising and lowering of injection head or heads 410, for example. Control panel 3110 may provide indication of the status of device 100 including power on, injection spacing, additive volume, injector firing, overspeed, such as by light and horn, speed warning, and low water pressure. For example, the speed sensor may be connected such that a signal indicative of the speed of device 100 is provided. As may be known to those possessing an ordinary skill in the pertinent arts, speed indication may be performed, for example, by utilizing a disc with holes on a movable wheel, sensor 210, for example, and by producing a signal proportional to the variation in magnetic field as holes in the disc move past the speed sensor a in coordinated movement with device 100. Further, a disc having 36 holes may be utilized with a wheel having a circumference of approximately 36 inches. Such a configuration may provide one hole of sensing per inch of travel. Other configuration may suitably be used, as would be evident to those possessing an ordinary skill in the pertinent art, to provide greater speed sensitivity. Alternatively, an infra red sensor or reader may be used as would be known in those skilled in the art for indicating the speed of device 100. Also, a low pressure switch may be activated when the incoming water pressure drops below a preset level.

A controller 2225, integral to control panel 3110, may include a suitable programmable computer. Controller 2225 may be housed within control panel 3110 and may receive input from various components of device 100 and may provide output to operating components of device 100. Solenoid 670 may be energized and de-energized by controller 2225. In determining when to cause operation of solenoid 670, controller 2225 may receive inputs from sensor wheel 210.

Control of the injection process may be accomplished through a control panel 3110, which may be attached to the vehicle towing device 100, or hand held by the towing vehicle operator or other person operating the device. Control panel 3110 may control the multiple poppet valves through sensor wheel 210 that may be raised in transport and lowered to the ground when in use. Sensor wheel 210 may also act as a dolly wheel for the device.

Selector switch 3130 for selecting different spacings between the slots formed in the ground by the jets from device 100 may be provided. Spacing 3130 may cause controller 2225 to maintain the selected spacing distance between the starting points of successive slots. For example, one choice may be a spacing of 1.5 inches from the starting point of one slot to the starting point of the next slot, another choice might be 3.0 inches between starting points, a third choice might be 4.5 inches between starting points, and a fourth choice might be 6.0 inches.

Depth selector 3125 may be provided on control panel 3110 to provide an input to controller 2225. Depth selection 3125 may be placed in one of several different positions which establishes the duration of blast time from device 100. When device 100 is stationary, the duration of blast time may have a direct relationship with the depth of the hole formed in the soil, while when device 100 is moving along its path of travel the duration of the blast may affect not only the depth of the resulting slot but also the length of the slot. Thus, the "depth" selected may determine the total volume of the opening or slot produced in the soil by the jet when device 100 is in motion.

Broadly speaking, device 100 is operated by towing device 100 in a "forward" or "reverse" direction along a path of travel. The ground speed is determined by the speed of the towing vehicle and monitored as discussed hereinabove.

In carrying out the injections, the water and additive material first come into contact with one another within mixing chamber 440 below each nozzle 158. As each nozzle 460 fires, its powerful jet of water rushing through mixing chamber 440 may induce a secondary air-stream within the corresponding additive hose 430, drawing the minute, accumulated charge of material 465 (FIG. 4) into mixing chamber 440 to be incorporated into the water jet. During the short pause between successive jets from each nozzle 460, enough material may have accumulated a minute charge of material in accumulating chamber 470 in preparation for the next blast from nozzles 460. Further, according to an aspect of the present invention, three to four cubic feet of additive material may be dispersed per one thousand square feet of soil or land covered, utilizing a three to five inch depth with three by four inch spacing.

Figure 21:
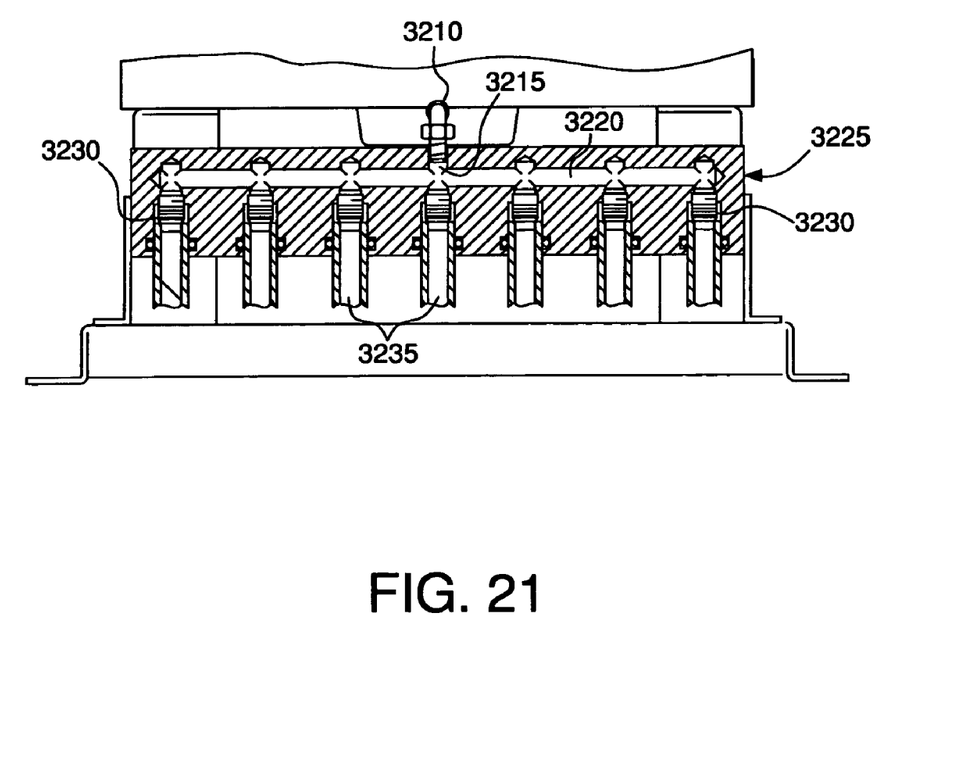
FIG. 21 is an enlarged, fragmentary, vertical cross-sectional view of an aspect of the liquid supply system of an exemplary embodiment of the present invention.

As illustrated in FIG. 21, distribution manifold 3225 has a single, central inlet passage 3215 to which a hose 3210 is connected. A longitudinal distributing bore 3220 runs along the length of distribution manifold 3225 and receives liquid from inlet passage 3215. A series of discharge nozzles 3230 may be connected with distribution bore 3220 and deliver pulses or increments of liquid into respective distribution hoses 3235. As similarly illustrated in FIG. 4, each of hoses 3235 is supported in a manner to produce a bight or bend so as to form an internal collecting chamber similar to the granular collecting chamber 470 of the first embodiment. Thus, during each pulse or blast of the injection head 410, an accumulated increment of additive is drawn into the injection head through each line and discharged along with the water jet out the discharge cone 425.

When the towing device is stopped or halted, injection head 410 stops operation, as commanded by controller 2225. Since no additional distance signals are inputted by the distance sensor of wheel 210 to controller 2225, controller 2225 does not allow discharge head 410 to fire.

As mentioned above, the device may be reversed at any time without complications. Although in many instances the operator may wish to turn the device around at the end of one pass and continue moving in a "forward" mode after the device is turned around, he may also stop the device and reverse the direction of travel, while at the same time steering the device to one side of the previous path so as to avoid applying another pass of material.

Figure 17:
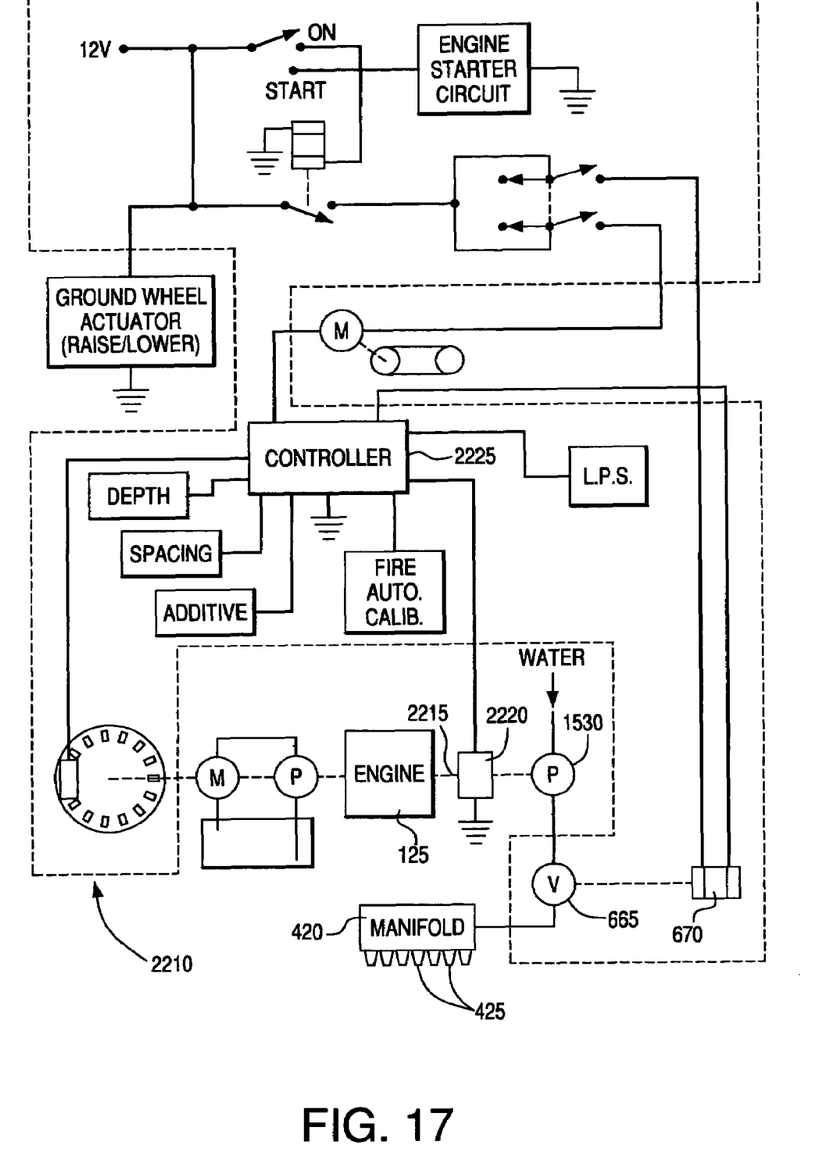
FIG. 17 is a schematic diagram of the various operating and control systems of an exemplary embodiment of the present invention.
Figure 18:
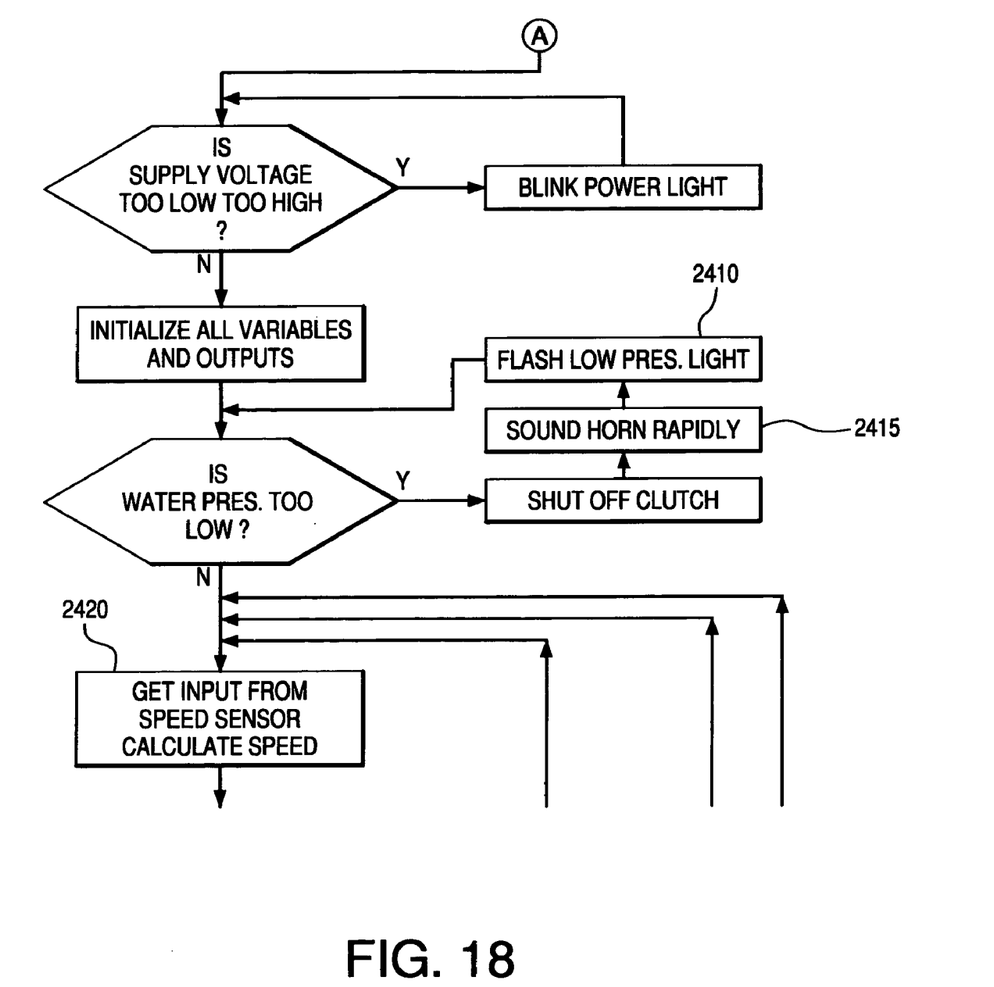
FIG. 18 is a flow chart illustrating steps followed by the control system of an exemplary embodiment of the present invention during operation.
Figure 19:
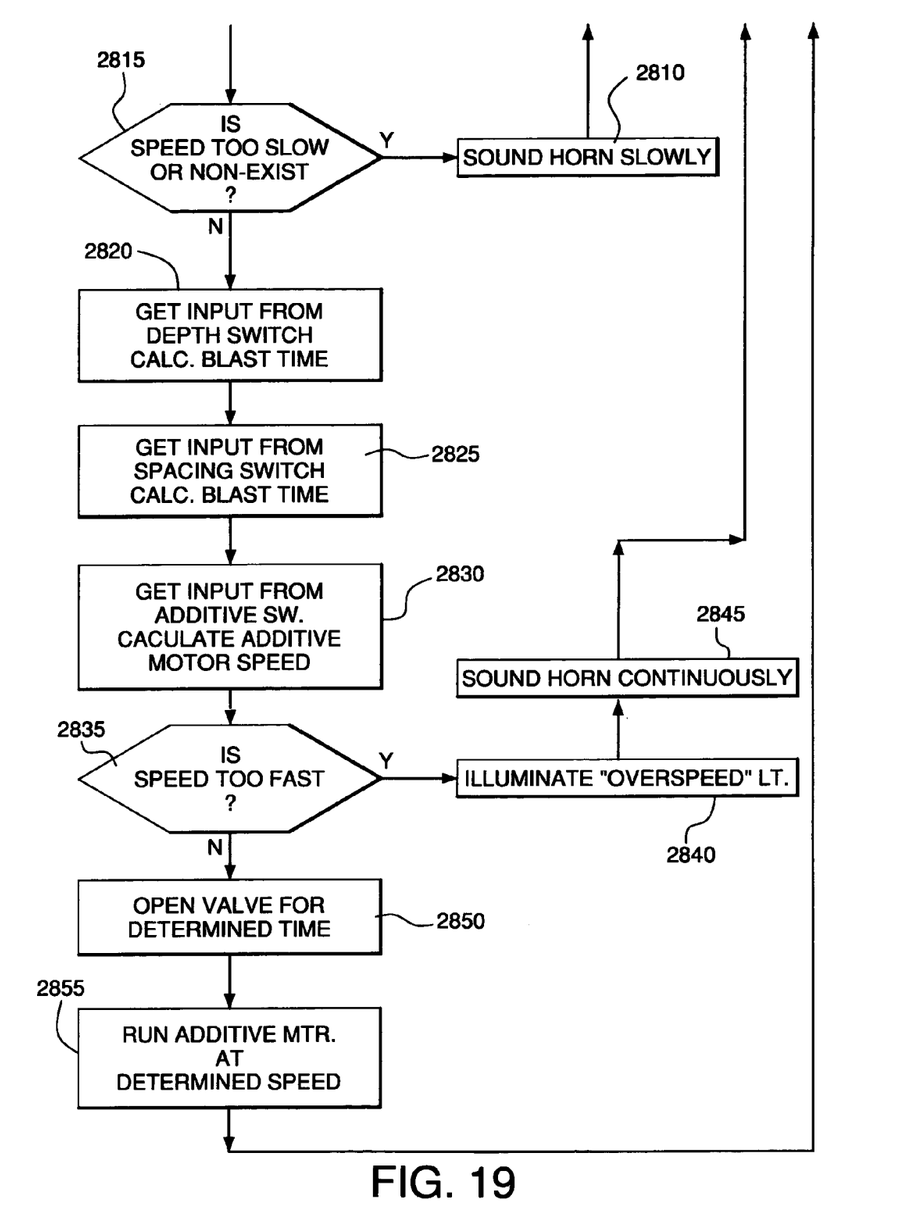
FIG. 19 is a flow chart illustrating steps followed by the control system of an exemplary embodiment of the present invention during operation.

As illustrated in FIGS. 17-19, controller 2225 may also check to determine whether the water pressure is too low, using the low pressure switch 3120. If it is too low, controller 2225 may disengage clutch 2220 at step 2810, then may proceed to sound the horn rapidly at step 2415, and the low pressure warning light may be flashed at step 2410. The analysis may then be repeated. If the water pressure is not too low, controller 2225 proceeds at step 2420 to obtain input from speed sensor 210 and to calculate the speed of movement of the device along the application path of travel.

Once controller 2225 has the input from speed sensor 210, controller 2225 at step 2815 checks to determine whether the ground speed is too slow or non-existent. If either of those conditions exists, controller 2225 at step 2810 causes the horn to sound slowly, and the analysis is repeated. If the speed is not too slow, controller 2225 proceeds to step 2820 to obtain input from depth switch 3125 so as to calculate the blast time. Then controller 2225 at step 2825 gets an input from spacing switch 3130 to calculate the time between blasts, as well as an input at step 2830 from additive switch 3145 to calculate the additive motor speed.

With these inputs in hand, controller 2225 decides at step 2835 whether the ground speed at which operator 2225 is moving device 100 is too fast to achieve the depth, spacing and additive functions inputted at steps 2820, 2825 and 2830. If the ground speed is too fast, controller 2225 at step 2840 causes the overspeed light 3150 to illuminate and at step 2845, the horn to sound continuously. The analysis is then repeated with inputs received from speed sensor 210, depth spacing switch 3125 and additive switch 3145.

If the ground speed is not too fast, controller 2225 proceeds at step 2850 to open solenoid valve 670 for a selected period of time and at step 2855, to run additive motor at the speed appropriate for the determined ground speed. Thereafter, controller 2225 loops back to step 2420 and obtains another input from speed sensor 210.

Those of ordinary skill in the art may recognize that many modifications and variations of the present invention may be implemented without departing from the spirit or scope of the invention. Thus, it is intended that the present invention covers the modifications and variations of this invention provided they come within the scope of the appended claims and their equivalents.

What is claimed is:

1. A towable device for treating and maintaining turf, comprising:
   at least one roller and manifold assembly, said at least one roller and manifold assembly including a plurality of injection heads for directing periodic high pressure jets of liquid and at least one additive material into the ground, said jets of liquid having a discrete pulse duration, wherein the depth of penetration of the jets into the soil is a function of the pulse duration, wherein said plurality of injection head creates a discharge pattern greater than 30 inches in width and at least 1 inch in depth;
   a liquid supply system for supplying pressurized liquid to said at least one injection head;
   an additive supply system for introducing said at least one additive material to said liquid within said at least one injection head; and
   a control system for controlling discharge from said at least one injection head.

2. The device of claim 1, further comprising a hinging mechanism, wherein said hinging mechanism positions said at least one roller and manifold assembly in contact with the ground surface when said at least one roller and manifold assembly is engaged, and positions said at least one roller and manifold assembly above the ground surface when said at least one roller and manifold assembly is not engaged.

3. The device of claim 1, wherein said discharge pattern is greater than 75 inches in width.

4. The device of claim 1, wherein said liquid supply system comprises at least one high pressure pump for supplying pressurized liquid to said at least one injection head.

5. The device of claim 1, wherein said at least one injection head comprises a nozzle connected with said liquid supply system for producing a jet of liquid when pressurized liquid is supplied to said nozzle, an outlet for the liquid jet downstream from said nozzle, and a mixing region between said nozzle and said outlet.

6. The device of claim 5, wherein said mixing region comprises an inlet connected with said additive supply system for admitting said at least one additive material to said mixing region for combination with the liquid jet produced by said nozzle.

7. The device of claim 6, wherein said at least one injection head further comprises a venturi for creating negative pressure with said mixing region to draw said at least one additive material through said inlet as the jet is discharged from said outlet.

8. The device of claim 1, wherein said control system comprises a controller, a distance sensor operable to provide ground traversing distance information to said controller, and a valve operable by said controller to admit successive bursts of pressurized liquid into said at least one injection head as a function of said distance information provided to said controller by said distance sensor.

9. The device of claim 8, wherein said controller further comprises a programmable computer.

10. The device of claim 9, wherein said controller further comprises means for selectively adjusting distance intervals between successive operations of said valve.

11. The device of claim 10, wherein said controller further comprises means for selectively adjusting the duration of each operation of said valve.

12. The device of claim 11, wherein said discharge pattern from said at least one injection head is related to the ground traversing distance while the device is moving along a path of travel.

13. The device of claim 1, wherein said additive supply system is suitable for delivering 3 to 4 cubic feet of said at least one additive material in granular form subsurfacely to 1000 square feet of soil or land.

14. The device of claim 1, wherein said additive supply system is suitable for delivering said at least one additive material in liquid form to said at least one injection head.

15. The device of claim 1, wherein said additive supply system further comprises a collecting chamber disposed to receive said at least one additive material, and to accumulate successive charges thereof.

16. The device of claim 15, wherein said injection head communicates with said collecting chamber, and wherein said additive supply system provides means for drawing the accumulated charge of said at least one additive material into the liquid jet during each discharge from said at least one injection head.

17. The device of claim 15, wherein said collecting chamber having an entrance thereto, said additive supply system being operable to deliver said additive material to said entrance substantially continuously during intermittent discharges of jets from said injection head.

18. A method of treating and maintaining turf, comprising:
producing successive high pressure jets of pressurized liquid;
directing said successive jets of pressurized liquid toward the ground creating a distribution pattern greater than 30 inches in width and at least 1 inch in depth along a path of travel, wherein said successive jets of pressurized liquid are at spaced intervals along said path of travel, and wherein the jets' depth of penetration into the soil is a function of the jets' pulse duration;
producing successive charges of at least one additive material;
maintaining each charge of said at least one additive material isolated from the liquid until a corresponding jet has been produced; and
introducing a charge of said at least one additive material into said corresponding jet as said corresponding jet is directed toward the ground.

19. The method of claim 18, wherein said spaced intervals are a function of distance traversed along said path of travel.

20. The method of claim 18, further comprising adjusting distance intervals between said successive jets of pressurized liquid along said path of travel.

21. The method of claim 18, further comprising adjusting the duration of said successive jets of pressurized liquid.

22. The method of claim 18, wherein said producing successive charges of said at least one additive material comprises adjusting the rate of production of said charges as a function of distance traversed along said path of travel.

23. The method of claim 18, wherein said directing said successive jets of pressurized liquid toward the ground comprises producing a region of negative pressure in association with said successive jets of pressurized liquid.

24. The method of claim 23, wherein said introducing a charge of said at least one additive material into said corresponding jet comprises drawing said charge of said at least one additive material into said corresponding jet using said region of negative pressure.

25. The method of claim 18, wherein said producing successive charges of said at least one additive material includes delivering said at least one additive material in a steady stream to a collecting chamber while said successive jets of pressurized liquid are produced intermittently.

26. The method of claim 25, wherein said introducing a charge of said at least one additive material into said corresponding jet includes drawing each charge out of said collecting chamber and into said corresponding jet.

27. The method of claim 26, wherein said delivering said at least one additive material to said collecting chamber in a steady stream includes adjusting the rate of delivery to said collecting chamber as a function of the distance traversed along said path of travel.

28. The method of claim 27, wherein directing successive jets of pressurized liquid into the ground occurs while said successive jets of pressurized liquid are in motion along said path of travel.

* * * * *